United States Patent [19]

Tisbo et al.

[11] Patent Number: 4,953,735
[45] Date of Patent: Sep. 4, 1990

[54] CONTAINER MOVABLE FROM FLAT TO CHANNEL-SHAPED CONFIGURATION

[75] Inventors: Cosmo N. Tisbo, Barrington; Robert J. Mack, Hoffman Estates, both of Ill.

[73] Assignee: Custom Plastics, Inc., Elk Grove, Ill.

[21] Appl. No.: 380,763

[22] Filed: Jul. 17, 1989

Related U.S. Application Data

[63] Continuation-in-part of Ser. No. 156,720, Feb. 17, 1988, abandoned.

[51] Int. Cl.$^5$ .................. B65D 5/26; B65D 6/18; B32B 7/06; H02G 3/04
[52] U.S. Cl. .................................. 220/6; 138/156; 174/68.3; 174/101; 206/820; 220/62; 220/7; 220/339; 428/122; 428/130
[58] Field of Search ................ 220/6, 7, 62, DIG. 25, 220/339; 428/121, 122, 130, 33, 35; 138/92, 151, 156, 157, 166; 174/62.3, 101; 206/820

[56] References Cited

U.S. PATENT DOCUMENTS

| | | | |
|---|---|---|---|
| 3,126,444 | 3/1964 | Taylor | 174/101 |
| 3,177,987 | 4/1965 | Swain | 138/156 |
| 3,179,284 | 4/1965 | Valyi | 206/820 |
| 3,446,415 | 5/1969 | Bromley | 220/62 |
| 3,462,208 | 8/1969 | Black | 220/62 |
| 3,638,359 | 2/1972 | Kruschwitz . | |
| 3,761,603 | 9/1973 | Hays | 138/157 |
| 3,790,062 | 2/1974 | Boyd . | |
| 3,905,475 | 9/1975 | Pritulsky | 206/820 |
| 4,057,165 | 11/1977 | Kardell . | |
| 4,202,157 | 5/1980 | Tansi | 220/7 |
| 4,235,346 | 11/1980 | Liggett | 220/62 |
| 4,391,303 | 7/1983 | Holgersson | 138/156 |
| 4,725,463 | 2/1988 | Baumber | 220/62 |

FOREIGN PATENT DOCUMENTS 2128709 5/1984 United Kingdom ............... 138/156

OTHER PUBLICATIONS

"Panduit Plastic Wiring Duct", Section WD, pp. 1–16.

*Primary Examiner*—George E. Lowrance
*Attorney, Agent, or Firm*—Fitch, Even, Tabin & Flannery

[57] ABSTRACT

An elongate container of one-piece resilient thermoplastic construction. The container includes a first wall having first and second lateral edges with a first latching component positioned adjacent the first lateral edge. A second wall has first and second lateral edges with a second latching component, for interlocking with the first latching component positioned adjacent its second lateral edge. The container also includes a hinge joining the first lateral edge of the first wall and second lateral edge of the second wall, with the hinge including a web of material having a thickness less than the thickness of the walls. The walls are relatively movable about the hinge between an as-formed position in which the first and second latching components are spaced and a use position in which the first and second walls extend relative to each other at a predetermined angle and the first and second latching components are in locking engagement. The container has a generally uniform cross section throughout its length so that it can be formed by extrusion. A method of using the container is also disclosed.

21 Claims, 3 Drawing Sheets

CONTAINER MOVABLE FROM FLAT TO CHANNEL-SHAPED CONFIGURATION

This application is a continuation-in-part of application Ser. No. 156,720 filed Feb. 17, 1988, abandoned.

This invention relates to container structures and, more particularly, to a one-piece, extruded wiring duct which can be manufactured in a flat configuration and later can be reconfigured to a channel shape.

BACKGROUND OF THE INVENTION

Plastic wiring duct, which is channel-shaped (having a bottom wall and a pair of spaced, vertical sidewalls), is used to route discrete electrical conductors and cable between predetermined locations. Such wiring ducts are typically manufactured by extrusion and are formed in the channel-shaped configuration. An example of such a duct is shown in United States Patent No. 3,890,459.

A relatively rigid channel shape is not particularly efficient for shipping purposes because the box containing the duct contains a high percentage of unfilled space. While a second duct can be inverted and positioned with one sidewall positioned between the sidewalls of the first duct, or ducts of progressively smaller size can be nested, the formation of such shipping arrangements requires the expenditure of additional labor and still results in appreciable empty space in the box. Of course, the shipping of a duct with so much air space makes the duct, although relatively rugged, more conducive to damage resulting from rough handling.

SUMMARY OF THE INVENTION

Among the aspects and features of the present invention may be noted the provision of an improved container and more particularly a wiring duct. The duct can be manufactured by extrusion in the form of a relatively flat blank for efficient shipping so that a large percentage of the shipping box can be occupied. Once the duct blank is removed from the box, the blank can easily and securely be reconfigured to the channel shape to form a wiring duct, all without the addition of any additional pieces. The blank can also be wound into a roll which is also an efficient shipping and storage configuration. The wiring duct of the present invention has long service life, is reliable in use, and is relatively easy and economical to manufacture. Other aspects and features of the present invention will be, in part, apparent and, in part, particularly pointed out in the following specification and accompanying drawings.

Briefly, the wiring duct of the present invention includes a bottom wall having first and second lateral edges with a bottom latching component positioned adjacent each of the edges, and a pair of sidewalls each having a proximal lateral edge and a distal lateral edge. Each sidewall has a side latching component positioned adjacent its proximal lateral edge. A first hinge joins the bottom wall first edge and the proximal edge of one sidewall and a second hinge joins the bottom wall second edge and the proximal lateral edge of the other sidewall. The sidewalls and bottom walls are relatively movable between an as-formed position in which the bottom latching components are not in latching engagement with their corresponding side latching components and a use position in which the bottom latching components are in latching engagement with their corresponding side latching components.

As a method of using a wiring duct blank for forming a channel-shaped wiring duct, the present invention includes the following steps:

a) the blank is shipped from the manufacturing site to the use site with the sidewalls and the bottom walls all positioned generally coplanar; and b) the channel-shaped duct is formed at the use site by pivoting the sidewalls relative to the bottom wall until the sidewall latching components lockingly engage their corresponding bottom wall latching components.

BRIEF DESCRIPTION OF THE DRAWINGS

Corresponding reference characters indicate corresponding components throughout the several views of the drawings.

DESCRIPTION OF THE PREFERRED EMBODIMENT

Figure 1:
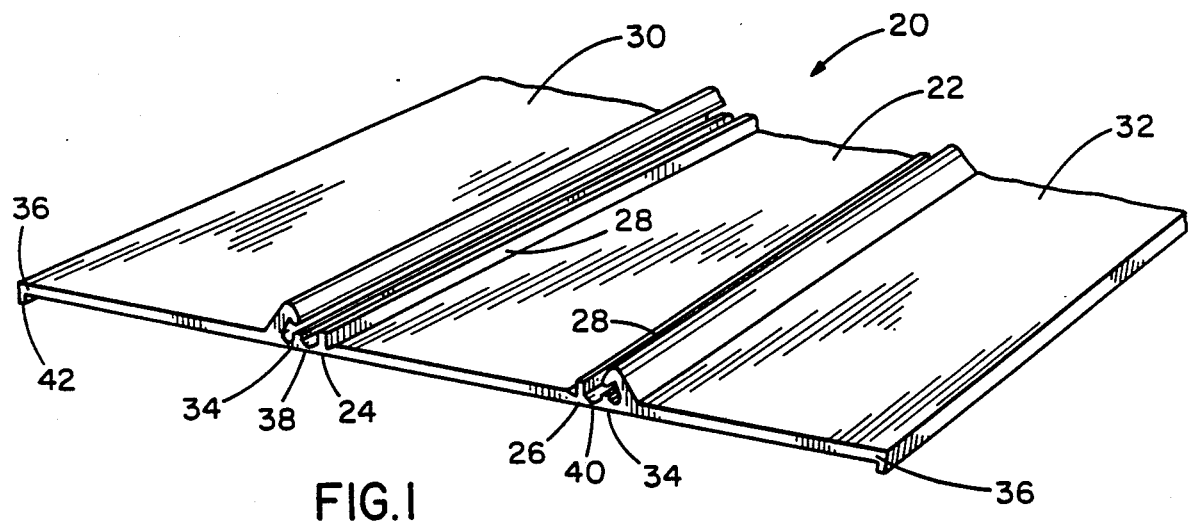
FIG. 1 is a perspective view of a wiring duct embodying various aspects of the present invention in a generally flat, as-formed configuration.
Figure 2:
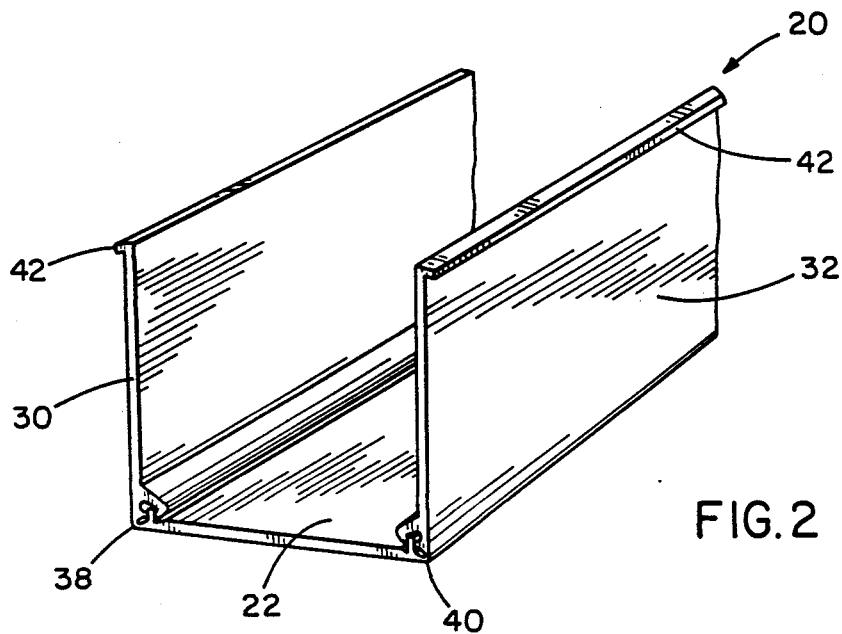
FIG. 2 is a perspective view of the wiring duct of FIG. 1 after its reconfiguration to a channel-shaped use configuration.

Referring now to the drawings, an elongate wiring duct for routing electrical conductors is generally indicated in FIGS. 1 and 2 by reference numeral 20. The wiring duct 20 can be reconfigured from a generally flat condition, shown in FIG. 1, in which it can be shipped in boxes with relatively high density because there is only a small amount of empty space in the shipping container, to a channel-shaped use condition, shown in FIG. 2. The wiring duct is of one-piece, resilient thermoplastic construction and has a generally uniform cross section so that it can be formed by extrusion. Among suitable materials for the wiring duct are rigid polyvinyl chloride, rigid polycarbonate and NORYL (a registered trademark of General Electric Co. for thermoplastic resin). It will be appreciated that while the following discusses the present invention in terms of a wiring duct, the various aspects of the present invention can also be embodied in a broad category of knockdown containers.

Figure 3:
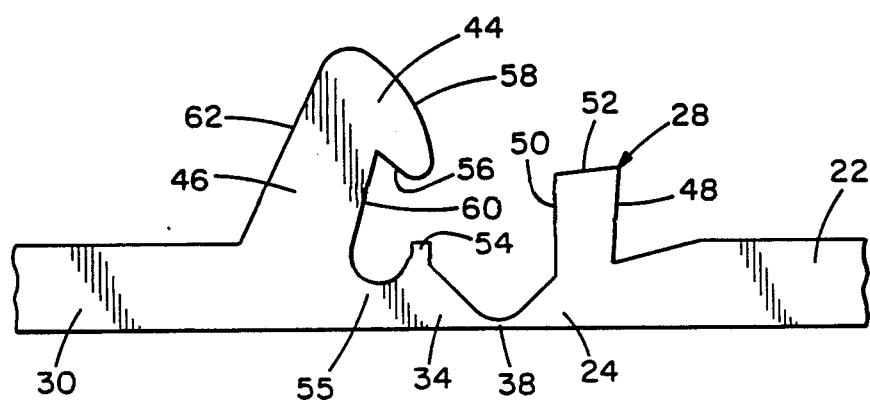
FIG. 3 is an enlarged, fragmentary front elevational view of the duct in its as-formed configuration showing a bottom wall having a latching component, a sidewall having a latching component and a hinge joining the walls.
Figure 4:
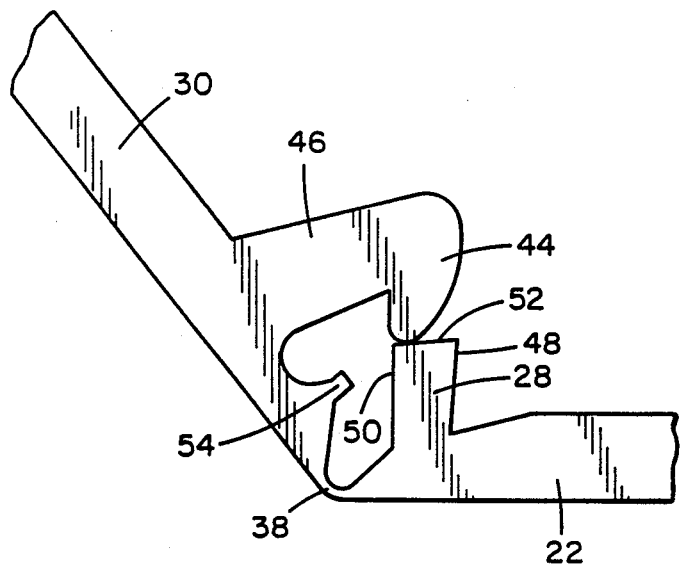
FIG. 4, similar to FIG. 3, illustrates the sidewall being moved toward the use configuration of the duct.
Figure 5:
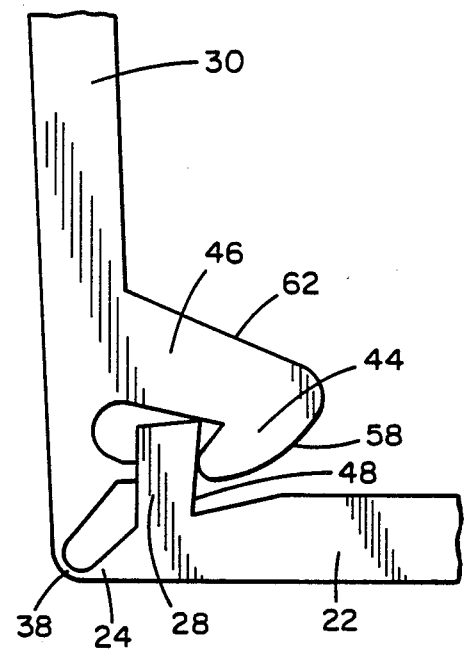
FIG. 5, also similar to FIG. 3, depicts the sidewall in the use configuration with the latching components interengaging.

FIG. 1 illustrates the wiring duct in its as-manufactured or blank condition. A bottom wall 22 has a first lateral edge 24 and a second lateral edge 26. A bottom latching component is positioned adjacent each edge. As best shown in FIGS. 3-5, each bottom latching component is in the form of a catch 28 extending vertically. The duct 20 also includes a pair of sidewalls 30 and 32 each having a proximal lateral edge 34 and a distal lateral edge 36. A first hinge 38 joins the bottom wall first lateral edge 24 and the proximal lateral edge 34 of one sidewall 30, while a second hinge 40 joins the bottom wall second lateral edge 26 and the proximal lateral edge of the other sidewall 32. Each of these hinges comprises a web of the thermoplastic material having a thickness about one-tenth the thickness of the walls. The sidewalls carry adjacent their proximal lateral edges a second latching component or hook means for lockingly engaging a corresponding catch to hold the duct in its use condition. There is an outwardly directed lip 42 at the distal end 36 of each sidewall. A cover (not shown) has inturned edges to capture the lips to maintain the cover in position. An example of such a cover is shown in U.S. Pat. No. 3,890,459.

More specifically and referring to FIGS. 3–5, as the duct is substantially symmetrical about a vertical plane through the bottom wall 22, only the hook means of the one sidewall 30 and its corresponding catch 28 need be described in detail. The hook means of sidewall 30 includes a hook 44 joined to the sidewall 30 by means of a hook support 46. The catch 28 has an engagement surface 48 engaged by the hook 44 when the wiring duct is in its use condition, a facing surface 50 facing the hinge 38, and a deflection surface 52 extending between the engagement surface 48 and the facing surface 50. The deflection surface, at the top of the catch, is inclined upwardly away from the hinge 38 while the engagement surface is inclined slightly away from the hinge 38.

Positioned between the hook support 46 and the hinge 38 is a standoff 54 for engaging the facing surface 50 of the catch when the sidewall 30 is in its use position in which it is generally normal to the bottom wall 22. The hook support 46 and the standoff 54 are spaced by a sidewall portion 55 of reduced thickness. In the as-formed condition as the duct, the hook support 46 is inclined toward the first hinge 38. The hook 44 has an undersurface 56 for contacting the engagement surface 48 and an outer surface 58. The hook support 46 includes an inner surface 60 for bearing on the top of the catch 28 to limit movement of the sidewall 30 about the hinge 38, and further includes a back surface 62. Referring to FIG. 5, showing the walls 22 and 30 in their use condition, the back surface 62 of the hook support extends downwardly to guide the electrical conductors into the lower reaches of the wiring duct to aid in full loading of the duct. On the other hand, the outer surface 58 of the hook 44 is inclined upwardly to guide conductors out of the duct so that they can be conveniently removed without hanging up or snagging on the hook.

Operation of the wiring duct 20 of the present invention is as follows: The duct is preferably manufactured and shipped in its blank condition in which the walls 22, 30 and 32 are generally coplanar. Once at the use location, a length of the duct (typically up to about ten feet) is removed from the shipping box and the installer pivots the sidewalls 30 and 32 to about the position shown in FIG. 4 where the end of the hook 44 contacts the deflection surface 52 of the catch 28. By applying force to the outside surfaces of the sidewalls, the hook of each sidewall is cammed slightly upwardly by the deflection surfaces 52 until each hook moves beyond its corresponding deflection surface, permitting that hook to snap over its corresponding catch resulting in the duct being in its channel-shaped use condition as shown in FIGS. 2 and 5. Depending upon their relative cross-sectional areas, this camming will result in the deformation of the hinge 38 and/or the hook support 46. With the relative dimensions shown in the FIGS., the primary deformation will be the stretching of the material forming hinge 38. Once the hook 44 passes the deflection surface 52, the hinge material, due to its resiliency, contracts. Preferably, the spacing between the hook 44 and the standoff 54 is slightly less than the thickness of the catch 28 where the catch is engaged by these two components, so that the catch is held in compression.

When in its use condition, the wiring duct 20 has rigidity approaching that of a similar duct extruded in its U-shaped configuration, except that the sidewalls can be moved back toward their as-formed condition, albeit with some difficulty because the hook 44 must ride over the top of the catch 28. However, with the duct cover in place, the top ends of the sidewalls are held in their vertical condition. Pivoting of the sidewalls inwardly beyond their vertical position is resisted by (a) the hook support inner surface 60 bearing on the top of the catch 28, (b) the standoff 54 abutting the facing surface 50 of the catch, and by the resistance of the material defining the hinges to stretching. The wiring duct is particularly well equipped to withstand a downwardly directed force applied to the sidewalls because relatively little of such force is borne by the hinges. Instead the relatively thick hook supports 46 are forced against the top of the vertical catches 28 which are loaded as columns in compression.

Figure 6:
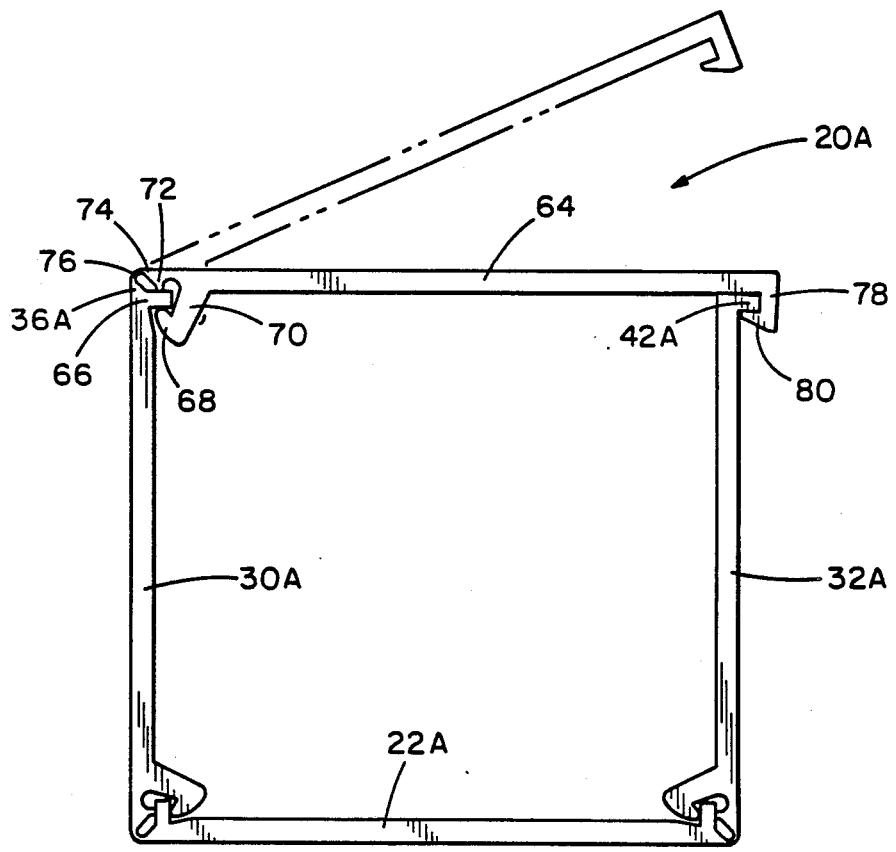
FIG. 6 is a front elevational view of an alternate embodiment of the present invention including a cover.
Figure 7:
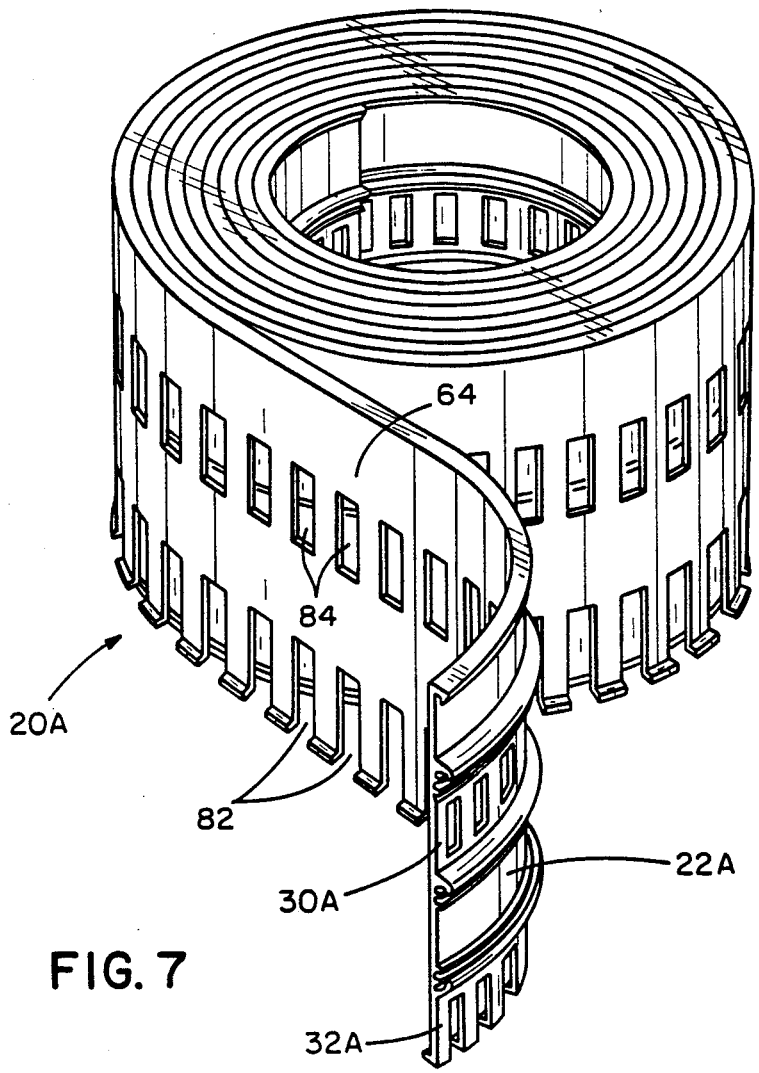
FIG. 7 is a perspective view of the wiring duct of FIG. 6 formed into a roll and with windows formed in the sidewalls for the passage of wires.

Referring now to FIG. 6, an alternative embodiment of the wiring duct of the present invention is generally indicated by reference character 20A. Components of wiring duct 20A corresponding to components of duct 20 are indicated by the reference numeral applied to the duct 20 with the addition of the suffix "A". Wiring duct 20A is similar to duct 20 except the duct 20A has an integrally formed top or cover 64. The one sidewall 30A carries a latching component, which can be a catch 66, adjacent its distal lateral edge 36A. The cover 64 has a cooperating latching component (formed by a hook 68 and a hook support 70 along with a standoff 72) adjacent a first lateral edge 74 which is joined to the distal edge 36A of the one sidewall 30A by a hinge 76. The remaining lateral edge of the cover is turned inwardly to form a clasp 78 for capturing the lip 42A extending outwardly from the distal lateral end of the other sidewall 32A. The clasp has an inclined undersurface 80 for deflecting the sidewall inwardly as the cover 64 is pivoted about the hinge 76 to close the duct 20A. The operation of the duct 20A is similar to that of duct 20 except that after the sidewalls and bottom wall are reconfigured to their channel shape and after the conductors are loaded into the duct, the cover 64 is pivoted about the hinge 76 from an open position (as suggested by the position of the cover shown in phantom) to its closed position in which the sidewall catch 66 is captured between the hook 68 and the standoff 72, and the lip of the other sidewall 32A is held by the clasp 78. A length of the wiring duct 20A is shown in FIG. 7 having been wound into a roll. Additionally, open-ended windows 82 have been formed along the length of the duct in sidewall 32A and sidewall 30A has a series of closed windows 84. These windows provide for the branching off of wires at selected locations from the main bundle of wires inside the duct. The roll is an efficient configuration for shipping and storage of the duct. As the material of the duct is resilient, the length of duct can easily be wound into a roll, particularly shortly after its manufacture by extrusion while the temperature of the material is still elevated. Although with time, the rolled length may take a set, when the length is straightened and formed into its channel shape, the sidewalls 30A, 32A prevent the duct from bending.

As a method of using the wiring duct blank to form a channel-shaped wiring duct, the present invention includes the following steps:

a) the wiring duct blank is shipped from the manufacturing site to the use site with the sidewalls 30 and 32 as well as the bottom wall 22 all generally coplanar, and b) the channel-shaped wiring duct is formed at the use site by pivoting the sidewalls 30 and 32 relative to the bottom wall 22 until the sidewall latching components lockingly engage their corresponding bottom wall latching components.

In view of the above, it will be seen that the several objects of the invention are achieved and other advantageous results attained.

As various changes could be made without departing from the scope of the invention, it is intended that all matter contained in the above description or shown in the accompanying drawings shall be interpreted as illustrative and not in a limiting sense.

What is claimed is:

1. An elongate container of one-piece resilient thermoplastic construction, said container comprising:
    a first wall having first and second lateral edges with a first latching component positioned adjacent the first lateral edge;
    a second wall having first and second lateral edges with a second latching component for interlocking with said first latching component and positioned adjacent the last-mentioned second lateral edge to fasten said walls together in a predetermined relative orientation; and
    a hinge joining the first lateral edge of said first wall and the second lateral edge of said second wall, said hinge comprising a web of material having a thickness less than the thickness of said walls, said walls being relatively movable about said hinge between an as-formed position in which said first and second latching components are spaced, and a use position in which said first and second walls extend relative to each other at a predetermined angle and said first and second latching components are in locking engagement, said container having a generally uniform cross section throughout its length so that it can be formed by extrusion,
    one of said first and second latching components comprising a catch having an engagement surface extending upwardly from its respective wall.
    the other of said first and second latching components comprising hook means including a support extending upwardly from its respective wall and having an undersurface extending in the direction of said catch, said undersurface adapted to engage said engagement surface and maintain said first and second walls in said use position.

2. A container as set forth in claim 1 wherein in said as-formed position said walls are substantially coplanar.

3. A container as set forth in claim 1 wherein in said use position said walls are substantially normal.

4. A container as set forth in claim 1 wherein said first latching component comprises a catch, and wherein said second latching component comprises a hook joined to said second wall by a hook support.

5. A container as set forth in claim 4 wherein said catch includes an engagement surface engaged by said hook when said walls are in their use position, and further includes a facing surface which faces said hinge.

6. A container as set forth in claim 5 wherein said second latching component further comprises a standoff positioned between said hook support and said hinge, said standoff engaging said facing surface of said catch when said walls are in said use position.

7. A container as set forth in claim 6 wherein said catch further includes a deflection surface extending between said engagement surface and said facing surface, said deflection surface being inclined away from said hinge.

8. A container as set forth in claim 7 wherein, in the as-formed position of said walls, said hook support is inclined toward said first wall, said hook having an undersurface for engaging said engagement surface whereby, as said walls are relatively moved toward said use position, said deflection surface cams said hook away from said first wall until said hook moves beyond said deflection surface permitting said hook to snap over said catch so that said undersurface abuts said engagement surface, said hook support having an inner surface bearing on said deflection surface when said walls are in their use position.

9. A container as set forth in claim 8 wherein the distance between said standoff and said hook is less than the spacing between said facing surface and said engagement surface whereby said catch is compressively held between said standoff and said hook in said use position.

10. A container as set forth in claim 6 wherein said standoff and said hook support are spaced by a portion of reduced thickness.

11. A container as set forth in claim 1 wherein said first wall has a first latching component positioned adjacent each of its lateral edges, said container further comprising a third wall having first and second lateral edges with one of said second latching components positioned adjacent the last-mentioned first lateral edge, said container further comprising a second hinge joining the second lateral edge of said first wall and the first lateral edge of said third wall, said container being symmetrical about a plane intersecting said first wall and extending in the longitudinal direction of said container.

12. An elongate duct for routing electrical conductors, said duct comprising:
    a bottom wall having first and second lateral edges with a bottom latching component positioned adjacent each of said edges;
    a pair of sidewalls each having a proximal lateral edge and distal lateral edge, and each having a side latching component disposed adjacent its proximal lateral edge;
    a first hinge joining the bottom wall first lateral edge and the proximal lateral edge of one sidewall; and
    a second hinge joining the bottom wall second lateral edge and the proximal lateral edge of the other sidewall, each of said hinges comprising a web of material having a thickness less than the thickness of said walls, said walls being relatively movable between an as-formed position in which the bottom latching components are not in latching engagement with their corresponding side latching components and a use position in which the bottom latching components are in latching engagement with their corresponding side latching components to fasten said sidewalls in said use position, said duct being of one-piece resilient thermoplastic construction and having a substantially uniform cross section throughout its length so that it can be formed by extrusion, said bottom latching components each comprising a catch having an engagement surface extending upwardly from its respective wall, said side latching components each comprising hook means including a support extending upwardly from its respective wall and having an undersurface extending in the direction of said catch, said undersurface adapted to engage said engagement surface and maintain said bottom wall and sidewalls in said use position.

13. A duct as set forth in claim 12 wherein in said as-formed position said sidewalls are substantially coplanar with said bottom wall, and wherein in said use position said sidewalls are disposed substantially vertically whereby said duct can be shipped in space efficient flat form and reconfigured at the use location to its channel-shaped configuration.

14. A duct as set forth in claim 13 wherein said one sidewall carries an additional latching component adjacent its distal lateral edge, said duct further comprising a cover with a width similar to that of said bottom wall, having first and second lateral edges and a third hinge joining the distal lateral edge of said one sidewall and the first lateral edge of said cover, said cover having a top latching component positioned adjacent its first lateral edge, said additional latching component and said cover latching component being engageable so that said cover substantially overlaps said bottom wall.

15. A duct as set forth in claim 12 wherein said bottom latching component adjacent said bottom wall first lateral edge comprises a substantially vertically extending catch, and wherein said side latching component of said one sidewall comprises a hook joined to its sidewall by a hook support.

16. A duct as set forth in claim 15 wherein said catch includes an engagement surface engaged by said hook when said duct is in its use position, and further includes a facing surface which faces said first hinge.

17. A duct as set forth in claim 16 wherein the side latching component of said one sidewall further comprises a standoff positioned between said hook support and said first hinge, said standoff engaging said facing surface of said catch when said duct is in its use position.

18. A duct as set forth in claim 17 wherein said catch further includes a deflection surface extending at the top of said catch between said engagement surface and said facing surface, said deflection surface being inclined upwardly away from said first hinge.

19. A duct a set forth in claim 18 wherein, in the as-formed position of said duct, said hook support is inclined toward said bottom wall, said hook having an undersurface for engaging said engagement surface so that as said duct is moved toward its use position said deflection surface cams said hook away from said bottom wall until said hook moves beyond said deflection surface causing said hook to snap over said catch.

20. An elongate blank for forming a container, said blank being of one-piece resilient thermoplastic construction and having a generally uniform cross section throughout its length so that it can be formed by extrusion, said blank comprising:

a first wall having a first lateral edge with an upwardly extending catch positioned adjacent said first lateral edge, said catch having an upper deflection surface;

a second wall having a proximal lateral edge with an upwardly extending means with a hook means extending at an angle therefrom for latching onto said catch disposed adjacent said proximal lateral edge; and a hinge joining the first lateral edge of said first wall and the proximal lateral edge of said second wall, said hinge comprising a web of material having a thickness less than the thickness of said walls, said walls being relatively pivotal about said hinge from a first position in which said walls are substantially coplanar and said catch and said hook means are spaced, to a second position wherein said walls are substantially normal and said hook means latches onto said catch, said hook means being deflected from its as-formed condition by said catch as said walls are moved to their second position, said blank further including a standoff extending upwardly from said second wall between said hinge and said upwardly extending means, there being a channel disposed between said standoff and said upwardly extending means on said second wall.

21. A wiring duct comprising a substantially planar wall having first, second and third wall sections, each having a substantially uniform cross section throughout its length whereby said wall may be manufactured by extrusion, each wall section having a latching component adapted to mate with a latching component on an adjacent wall section, a plastic hinge having a thickness less than the thickness of adjacent wall sections interconnecting each of said adjacent wall sections, said latching component on a wall section when engaged with the latching component on an adjacent wall section maintaining said adjacent wall sections in a substantially perpendicular relationship whereby when the adjacent latching components are engaged, said planar wall defines a substantially U-shaped channel with the second wall section defining a bottom and the first and third wall sections defining sides, said channel having an open top and open ends for the receipt of wires.

and a cover having means for engaging the first and third wall sections forming the sides of said U-shaped channel to close said open top and secure wires in said wiring duct.

* * * * *

UNITED STATES PATENT AND TRADEMARK OFFICE
CERTIFICATE OF CORRECTION

PATENT NO. : 4,953,735

DATED : September 4, 1990

INVENTOR(S) : Cosmo N. Tisbo et al.

It is certified that error appears in the above-identified patent and that said Letters Patent is hereby corrected as shown below:

Column 4, line 19, after "b" insert a space.

Column 5, line 51, change the period to a comma.

Column 5, lines 63-66, delete Claim 4.

Column 5, line 67, change "4" to --1--.

Columns 5, line 68, through Column 6, line 2, delete "includes an engagement surface engaged by said hook when said walls are in their user position, and further".

Column 6, line 4, change "second" to --other--.

Column 6, line 5, after "said" delete "hook".

Column 6, line 14, after "said" delete "hook".

Column 6, line 15-16, delete ", said hook having an undersurface for engaging said engagement surface".

Column 6, line 18, after "hook" insert --means--.

Column 6, line 19, after "hook" insert --means--.

Column 6, line 20, after "hook" insert --means--.

Column 6, line 22, after "said" delete "hook".

Column 6, line 25, change "8" to --6--.

Column 6, line 26, after "hook" insert --means--.

Column 6, line 29, after "hook" insert --means--.

Column 6, line 32, after "said" delete "hook".

Column 7, lines 33-38, delete Claim 15.

UNITED STATES PATENT AND TRADEMARK OFFICE
CERTIFICATE OF CORRECTION

PATENT NO. : 4,953,735

DATED : September 4, 1990

INVENTOR(S) : Cosmo N. Tisbo et al.

It is certified that error appears in the above-identified patent and that said Letters Patent is hereby corrected as shown below:

Column 7, line 39, change "15" to --12--.

Column 7, lines 40-41, delete "an engagement surface engaged by said hook when said duct is in its use position, and further includes".

Column 7, line 45, after "said" delete "hook".

Column 7, line 54, change "a" to --as--.

Column 7, line 55, after "said" delete "hook".

Column 7, lines 56-57, delete "said hook having an undersurface for engaging said engagement surface".

Column 7, line 59, after "hook" insert --means--.

Column 8, line 1, after "hook" insert --means--.

Column 8, line 2, after "hook" insert --means--.

Column 8, line 54, change the period to a comma.

Signed and Sealed this

Tenth Day of March, 1992

Attest:

HARRY F. MANBECK, JR.

*Attesting Officer*      *Commissioner of Patents and Trademarks*